UNITED STATES PATENT OFFICE.

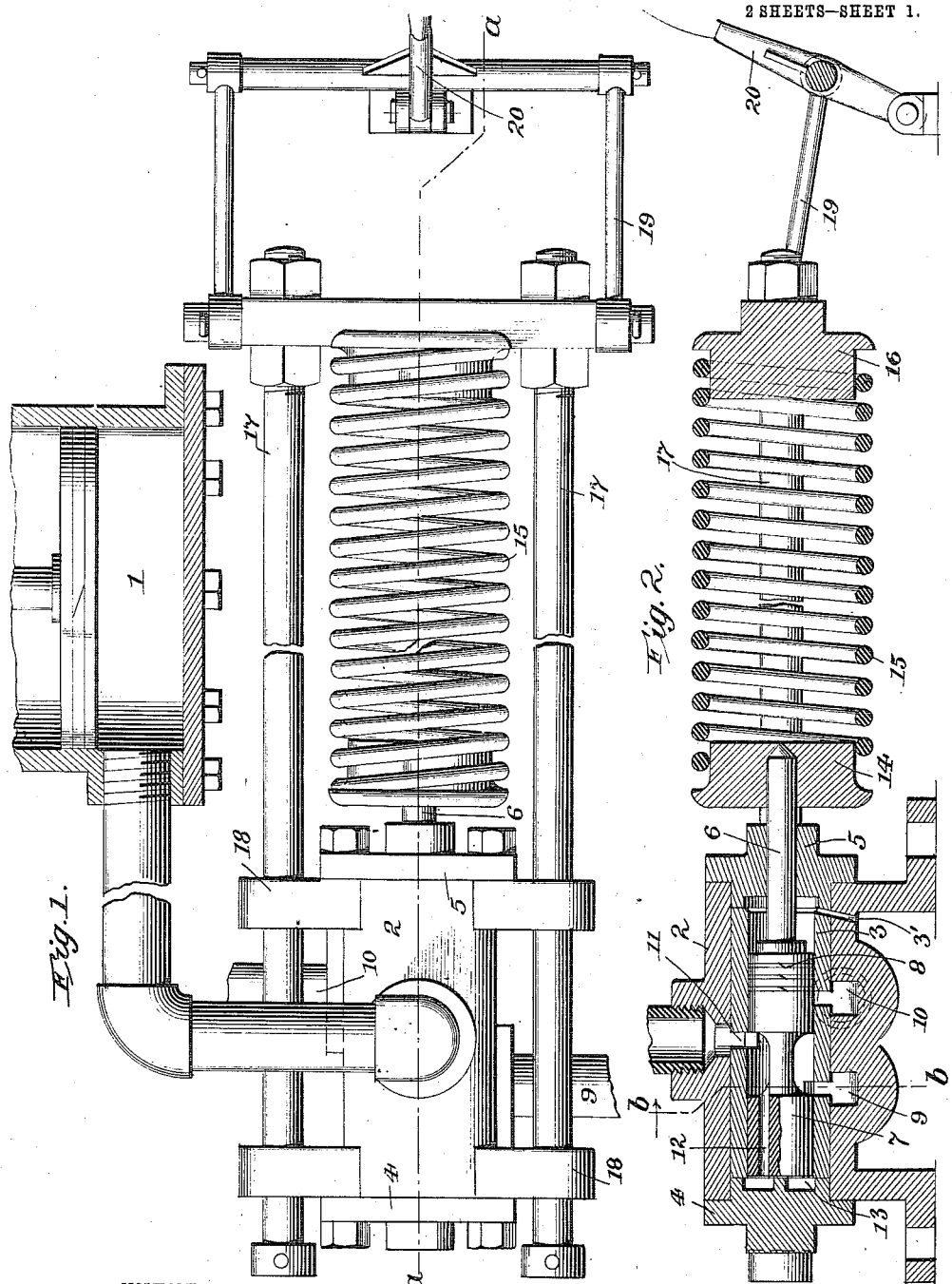

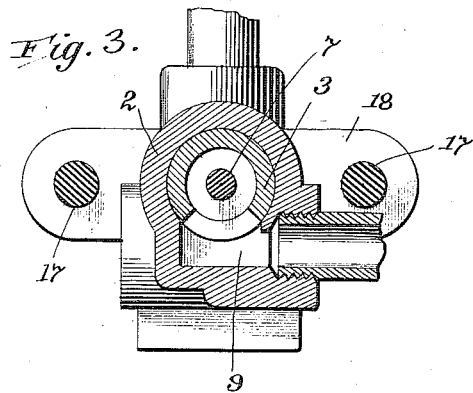
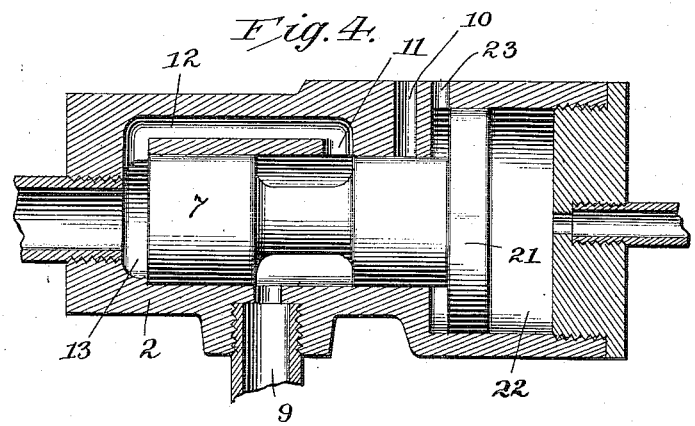

FRANK A. LOCKWOOD, OF DENVER, COLORADO, ASSIGNOR TO THE DENVER ENGINEERING WORKS CO., A CORPORATION OF COLORADO.

PRESSURE-CONTROLLING VALVE.

957,511.  Specification of Letters Patent.  Patented May 10, 1910.

Application filed May 28, 1909. Serial No. 499,020.

*To all whom it may concern:*

Be it known that I, FRANK A. LOCKWOOD, a citizen of the United States, residing at Denver, in the county of Denver and State of Colorado, have invented certain new and useful Improvements in Pressure - Controlling Valves, of which the following is a specification.

My present invention relates to pressure controlling valves, and particularly to valves intended to control the application and release of brakes on steam hoists and similar mechanisms.

The object of the invention is the construction of a valve which shall control directly the pressure in the brake cylinder or other similar mechanism, this pressure being approximately proportional to the pressure on the control lever, the valve being subject simultaneously to the force applied by the control lever and to the pressure existing in the controlled mechanism, the valve functioning both to admit fluid to this mechanism or release it therefrom.

The device is applicable to a large range of purposes, but as stated it is particularly adapted for the controlling of fluid operated brakes for hoists.

Heretofore it has been customary so to arrange the valve gear in such braking mechanism that a given movement of the control lever would produce a corresponding movement of the brake piston regardless of the pressure exerted to secure such movement. By my device a given movement of the control lever produces a corresponding change of pressure in the brake cylinder, the movement of the brake piston accommodating itself to the conditions.

The advantages secured by my device are a more flexible and ready control, in that the braking action corresponding to a given position of the control lever is constant or approximately so. Also in case of eccentricity or irregularity of the brake drum the devices will readily adapt themselves, the piston moving slightly without affecting to any extent the valve mechanism. In the usual structure such motion immediately affects the valve mechanism and causes unsatisfactory action.

To the attainment of the above named desirable properties and certain other advantages which will hereinafter appear, my invention consists in certain constructions and combinations of parts now to be described and illustrated in the accompanying drawings, wherein, Figure 1 is a plan view of my improved valve mechanism with the piping connections to a brake cylinder illustrated diagrammatically; Fig. 2, is a longitudinal sectional elevation of the valve mechanism, the plane of section being taken on the line $a$—$a$ of Fig. 1; Fig. 3, is a transverse sectional elevation of the valve mechanism on the line $b$—$b$ of Fig. 2; and Fig. 4, is a longitudinal sectional view of a modified form of the apparatus adapted to other purposes, later to be described.

Referring now to Figs. 1, 2 and 3, 1 is the brake cylinder to be controlled. It is obvious that a plurality of such cylinders might be controlled by one valve since it is merely a question of pressure to be produced in such cylinders. The cylinders, moreover, may be of any desirable type, the braking mechanism being constructed in any of the well known forms for this purpose.

2 is the casing of the valve and 3 is a bushing or liner forced therein and forming the valve seat.

4 is a tightly fitting head closing one end of the valve chamber and 5 is a head closing the other end and having an opening for the passage of the valve rod 6 forming an extension of the valve member 7 sliding within the bushing or valve seat 3. This member 7 is provided with suitable packing rings or grooves 8. The valve seat or bushing has formed in it three ports. Of these ports 9 is the admission port, and port 10 the exhaust port, 9 being connected by piping to the source of steam or compressed air and 10 being open directly to the atmosphere. Port 11 is connected as shown to the brake cylinder or cylinders. The valve member 7 is preferably cylindrical in form with a reduced middle portion. It is so proportioned that in its mid-position it will blank off or close the ports 9 and 10, but when displaced to the left from the mid-position will connect the port 9 to port 11, thus effecting communication between the source of fluid under pressure and the brake cylinder, and when displaced to the right from the mid-position will connect port 10 to port 11, thus connecting the brake cylinder to the atmosphere or whatever other exhaust connection is provided. The space to the right of 7 is vented at 3'. A port or passage 12, shown in Fig. 2, passes through valve member 7, and places chamber 13, which is that portion of the valve chamber behind the left end of the valve, in communication with port 11, and causes the pressure in port 11 and chamber 13 to equalize. This port might equally well be formed in the shell 2, its purpose being merely to equalize the pressure between port 11 and chamber 13. The effect of this equalization of pressure between 11 and 13 is to cause the pressure existing in 11 to urge valve 7 to the right and since the pressure in 11 is practically the same as the pressure in the brake cylinder, this tendency of valve 7 to move to the right is directly proportional to the pressure in the brake cylinder. Fastened to the end of valve rod 6 is a spring abutment 14 against which bears one end of spring 15, whose other end bears against abutment 16 carried on the sliding rods 17 mounted in guides 18 which in turn are carried on or cast integrally with the valve shell 2. The motion of these sliding rods is parallel to that of the valve rod 6. The abutment 16 is connected by links 19 to a hand lever 20. Thus the movement of the hand lever 20 to the left compresses spring 15 and thereby increases the resistance offered to valve 7 which is urged to the right by the pressure in the brake cylinder acting through ports 11 and 12. A movement of hand lever 20 to the right has the opposite effect.

Now since movement of the valve 7 to the left tends to admit pressure to the brake cylinder and movement to the right to relieve it therefrom, it is obvious that an increased tendency to hold valve 7 to the left will require a greater pressure in brake cylinder 1 before this pressure can force valve 7 to the right to a closing position. Assuming now that the valve has so closed, it is obvious that a partial release of pressure on spring 15 will allow the pressure in the brake cylinder to force valve 7 to the right, opening port 10 and relieving the pressure in 1 until it has fallen to such a point that valve 7 will be forced to the left to a closed position. Thus it will be seen that the pressure produced in brake cylinder 1 is directly proportional to the pressure exerted on hand lever 20, (neglecting effects of friction of valve 7 which is slight). I am thus able to control and vary the pressure in the brake cylinder throughout its range or entirely to remove it by the manipulation of a single lever, for the moving of this lever 20 to its extreme right position relieves all pressure on spring 15 when the apparatus is properly adjusted.

Referring now to Fig. 4, I will explain a modified form of the device, in which one fluid pressure is caused to control the flow of another fluid at greater pressure. The device is closely similar and identical parts are numbered in the same manner. The port 12 in this case is shown as formed in the valve shell. Instead of the spring 15 and the mechanism for varying its tension, I form on the end of valve 7 a piston 21 sliding in the chamber 22. The space on the left side of this piston is vented to the atmosphere at 23, and that on the other side is connected so as to receive fluid under pressure. By varying the pressure of this fluid a variable resistance to the motion of valve 7 toward the right is presented, the apparatus otherwise functioning in the same manner as previously described with regard to the lever control. By this arrangement if the area of the piston 21 is properly selected one might control the operation of the valve by blowing into chamber 22. In this manner the apparatus might be used for controlling the blowing of glass by compressed air or for similar purposes.

By the peculiar construction adopted I am enabled to secure a pressure controlling valve subject simultaneously to the pressure in the controlled device and to the force exerted upon the controlling lever. The device not only operates to admit fluid to the device when the pressure is below that desired, but will also vent to the atmosphere in excess of pressure in the controlled device above that desired. The pressure in the controlled device may be determined accurately and is approximately proportional to the force exerted upon the controlling lever. Moreover, the device is simple in construction, and capable of cheap manufacture, since it dispenses entirely with differential pistons, or pistons of different diameters, and since the number of working parts is reduced to the possible minimum. The range of control by the device varies from zero pressure in the controlled device to the maximum pressure furnished by the supply.

The formation of the bypass or pressure equalizing passage 12 in the valve member 7, as illustrated in Fig. 2, is of course not essential to the successful functioning of the device, but this construction, by simplifying the patterns for the castings, is important from the point of economical manufacture.

Having thus described my invention, what I claim is:—

1. A valve mechanism comprising a casing having a closed end, and provided with admission and exhaust ports, and with a third port adapted to be connected to a controlled device; a valve member slidable within said casing, comprising two pistons with an intermediate portion adapted to communicate with each of the ports; a passage leading through one of said pistons and establishing communication between the closed end portion of said valve chamber and the intermediate portion of said valve member; and means for applying a variable opposition to the movement of said valve member.

2. A valve mechanism comprising a casing having a closed end, and provided with admission and exhaust ports, and with a third port adapted to be connected to a controlled device; a valve member slidable within said casing, comprising two pistons with an intermediate portion adapted to communicate with each of the ports; a passage leading through one of said pistons and establishing communication between the closed end portion of said valve chamber and the intermediate portion of said valve member; and a spring opposing the movement of said valve member.

3. A valve mechanism comprising a casing having a closed end, and provided with admission and exhaust ports, and with a third port adapted to be connected to a controlled device; a valve member slidable within said casing, comprising two pistons with an intermediate portion adapted to communicate with each of the ports; a passage leading through one of said pistons and establishing communication between the closed end portion of said valve chamber and the intermediate portion of said valve; a spring opposing the movement of said valve member; and means for varying the stress on said spring.

4. A controlling valve mechanism for fluid pressure controlled devices comprising in combination a valve chamber, closed at one end, and provided with admission and exhaust ports, and with a third port adapted to be connected to the controlled device, and located intermediate said admission and exhaust ports; a close fitting valve member movable in said valve chamber and consisting of end portions, and a reduced middle portion adapted to connect the said third port successively with the admission port and the exhaust port, and one of said end portions having a passage connecting the space about said reduced middle portion of the valve member with the space at the closed end of said valve chamber; and means for applying an elastic pressure urging said valve member toward the closed end of said valve chamber.

5. A controlling valve mechanism for fluid pressure controlled devices comprising in combination a valve chamber, closed at one end, and provided with admission and exhaust ports, and with a third port adapted to be connected to the controlled device, and located intermediate said admission and exhaust ports; a close fitting valve member movable in said valve chamber and consisting of end portions and a reduced middle portion adapted to connect the said third port successively with the admission and the exhaust port, and one of said end portions having a passage connecting the space about said reduced middle portion of the valve member to the space at the closed end of said valve chamber; a spring urging said valve member toward the closed end of said valve chamber; and means for varying the stress on said spring.

6. A controlling valve for fluid pressure operated devices comprising in combination, a valve chamber having a closed end; an admission port formed in said chamber; an exhaust port formed in said chamber; a third port formed in said chamber and adapted to be connected to the controlled device; a valve member slidable in said chamber and fitting closely to the walls thereof, said valve connecting said third port with said admission port when in one position and the said third port with said exhaust port when in another position; a by pass adapted to establish communication between said third port and the space at the closed end of said valve chamber; and means for applying a variable opposition to the motion of said valve member.

7. A controlling valve for fluid pressure operated devices comprising in combination, a valve chamber having a closed end; an admission port formed in said chamber; an exhaust port formed in said chamber; a third port formed in said chamber and adapted to be connected to the controlled device; a valve member slidable in said chamber and fitting closely to the walls thereof, said valve connecting said third port with said admission port when in one position and the said third port with said exhaust port when in another position; a by pass adapted to establish communication between said third port and the space at the closed end of said valve chamber; a spring opposing the motion of said valve member; and means for varying the stress on said spring.

8. A controlling valve for fluid pressure operated devices comprising in combination, a valve chamber; a valve seat in said chamber; an admission port formed in said seat; an exhaust port formed in said seat; a third port formed in said seat and adapted to be connected to the controlled device; a valve sliding on said seat and connecting said third port to said admission port when in one position and said third port to said exhaust port when in another position, said valve being so subject to the pressure in the third port that said pressure urges said valve member toward the second named position; a rod carried on said valve member; a spring abutment carried on said rod; longitudinal guides; a second spring abutment carried on said guides; mechanism for moving said second spring abutment; and a spring interposed between said abutments.

In testimony whereof I have signed my name to this specification in the presence of two subscribing witnesses.

FRANK A. LOCKWOOD.

Witnesses:
 LEWIS SEARING,
 LYMAN P. HAMMOND.